(12) United States Patent
Toba

(10) Patent No.: US 9,787,226 B2
(45) Date of Patent: Oct. 10, 2017

(54) ALTERNATING CURRENT ELECTRIC SYSTEM AND CONTROL METHOD THEREOF

(71) Applicant: FUJI ELECTRIC CO., LTD., Kawasaki-shi (JP)

(72) Inventor: Akio Toba, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 285 days.

(21) Appl. No.: 14/457,820

(22) Filed: Aug. 12, 2014

(65) Prior Publication Data
US 2014/0346988 A1 Nov. 27, 2014

Related U.S. Application Data

(63) Continuation of application No. PCT/JP2012/083558, filed on Dec. 26, 2012.

(30) Foreign Application Priority Data

Mar. 30, 2012 (JP) .................... 2012-080286

(51) Int. Cl.
*H02H 7/09* (2006.01)
*H02P 6/00* (2016.01)
(Continued)

(52) U.S. Cl.
CPC .......... *H02P 6/002* (2013.01); *H02P 3/22* (2013.01); *H02P 23/0004* (2013.01); *H02P 29/0241* (2016.02)

(58) Field of Classification Search
CPC ........ H02P 27/06; H02P 29/0241; H02P 6/28; H02P 6/182; H02P 6/002; H02H 7/122; H02H 3/08
(Continued)

(56) References Cited

U.S. PATENT DOCUMENTS 5,782,610 A  7/1998 Ikeda
6,121,736 A * 9/2000 Narazaki ............... H02P 6/085
                                                    318/400.02
(Continued)

FOREIGN PATENT DOCUMENTS

CN   101120504 A   2/2008
JP   H09-47055 A   2/1997
(Continued)

OTHER PUBLICATIONS

Chinese Office Action dated Feb. 14, 2016 and its partial English translation.
(Continued)

*Primary Examiner* — Bentsu Ro
*Assistant Examiner* — Thai Dinh
(74) *Attorney, Agent, or Firm* — Rabin & Berdo, P.C.

(57) ABSTRACT

When the current flowing through each electric terminal of an AC motor 21 reaches the vicinity of zero, an operation putting the electric terminals of the AC motor 21 into an opened state, or putting an electric terminal into a conductive state via a reflux diode inside an inverter 11, is carried out. Herein, as an operation such that the current flowing through each electric terminal reaches the vicinity of zero, the electric terminals are short-circuited by all upper arm or lower arm switching elements of the inverter 11 being turned on. By so doing, a flow of electromagnetic energy of a reactance component of the AC motor 21, from the AC motor 21 into the inverter 11 side when the drive of the inverter 11 is stopped, is prevented or suppressed. As a result of this, an overvoltage or overcurrent is prevented.

16 Claims, 15 Drawing Sheets

(51) Int. Cl.
*H02P 3/22* (2006.01)
*H02P 23/00* (2016.01)
*H02P 29/024* (2016.01)

(58) Field of Classification Search
USPC ............ 318/400.22, 400.01, 400.26, 400.34, 318/400.35, 722, 434
See application file for complete search history.

(56) References Cited

U.S. PATENT DOCUMENTS

| | | | | |
|---|---|---|---|---|
| 6,531,839 | B1 * | 3/2003 | Shin ................. | H02P 6/24 318/362 |
| 6,737,828 | B2 * | 5/2004 | Kiuchi ............... | D06F 37/304 318/269 |
| 6,922,032 | B2 * | 7/2005 | Maeda ............... | H02P 6/24 318/286 |
| 7,023,170 | B2 * | 4/2006 | Yasukawa ......... | H02P 27/04 318/705 |
| 7,199,538 | B2 * | 4/2007 | Kameya ............ | B62D 5/046 180/443 |
| 8,054,026 | B2 * | 11/2011 | Shimana ........... | B60L 3/003 318/490 |
| 8,232,752 | B2 * | 7/2012 | Kezobo ............. | G01R 31/42 318/400.01 |
| 8,384,321 | B2 * | 2/2013 | Jeong ................ | H02P 6/20 318/400.01 |
| 8,716,967 | B2 * | 5/2014 | Okumura .......... | H02P 29/0241 318/400.07 |
| 8,823,301 | B2 * | 9/2014 | He ..................... | H02P 6/002 318/400.01 |
| 2003/0102833 | A1 * | 6/2003 | Murakami ......... | H02P 6/24 318/362 |
| 2006/0181239 | A1 | 8/2006 | Galli et al. | |
| 2007/0093359 | A1 * | 4/2007 | Kobayashi ........ | B60K 6/48 477/107 |
| 2010/0036555 | A1 * | 2/2010 | Hosoda ............. | B60L 3/003 701/22 |
| 2011/0241589 | A1 * | 10/2011 | Danjo ................ | B60L 3/003 318/453 |

FOREIGN PATENT DOCUMENTS

| | | | |
|---|---|---|---|
| JP | H09-163791 A | | 6/1997 |
| JP | 2006-141110 A | | 6/2006 |
| JP | 2007-174766 A | * | 7/2007 |
| JP | 2007-174766 A | | 7/2007 |
| JP | 2007-236080 A | | 9/2007 |
| JP | 2008-530971 A | | 8/2008 |
| JP | 2008-312389 A | | 12/2008 |
| JP | 2010-279084 A | | 12/2010 |

OTHER PUBLICATIONS

Jun-ichi Itoh et al., "Suppression Method of Rising DC Voltage for the Halt Sequence of an Inverter in the Motor Regeneration", 2013 IEEE Energy Conversion Congress and Explosition, pp. 188-195, Jul. 12, 2012.

* cited by examiner

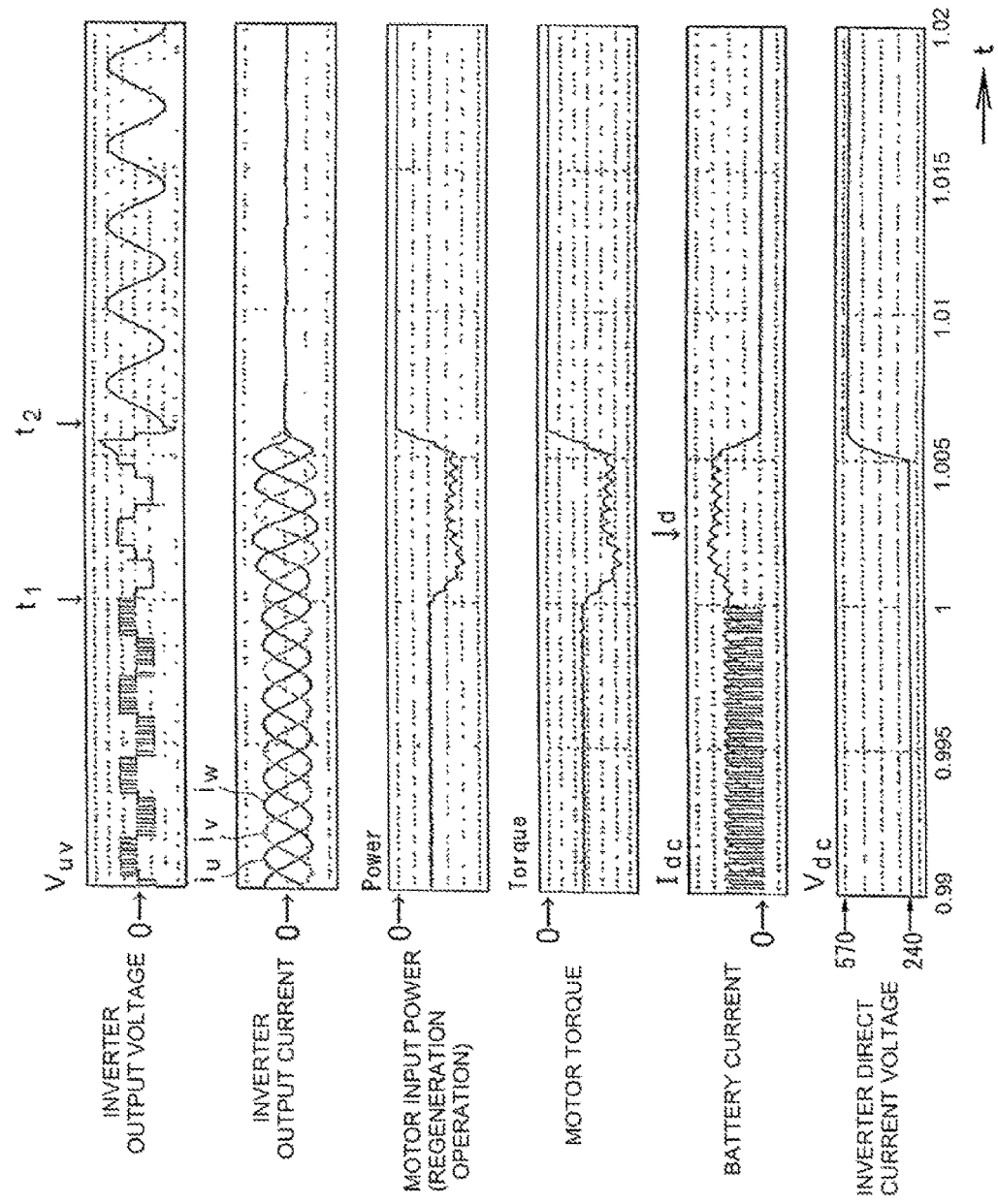

ALTERNATING CURRENT ELECTRIC SYSTEM AND CONTROL METHOD THEREOF

CROSS-REFERENCE TO RELATED APPLICATIONS

This application is a bypass continuation application of International Application number PCT/JP2012/83558, filed on Dec. 26, 2012 and designating the United States. Furthermore, this application claims the benefit of foreign priority of Japanese application 2012-080286, filed on Mar. 30, 2012. The disclosures of these earlier applications are hereby incorporated herein by reference.

TECHNICAL FIELD

The present invention relates to an alternating current electric system including an alternating current electric machine, such as an alternating current motor, alternating current generator, or alternating current power supply, and a power converter that exchanges power with the alternating current electric machine. More specifically, the invention relates to an alternating current electric system, and to a control method thereof, such that a flow of electromagnetic energy from the alternating current electric machine to the power converter side when the drive of the power converter is stopped is prevented or suppressed.

BACKGROUND ART

FIG. 11 is a conceptual diagram showing one example of an alternating current electric system. In FIG. 11, 10 is a power converter that can control alternating current power, like an inverter or converter, and 20 is an alternating current electric machine such as an alternating current motor or alternating current power supply.

The alternating current electric system is such that alternating current power is exchanged between the power converter 10 and alternating current electric machine 20 by a power conversion operation by the power converter 10 and a motor operation, generator operation, or the like, by the alternating current electric machine 20.

In the heretofore described configuration, a reactance component exists in the alternating current electric machine 20, and reactance also exists in a cable between the power converter 10 and alternating current electric machine 20. Also, reactance also exists in a reactor or filter acting as a part connected partway along the cable. In FIG. 11, 30 indicates the reactance component excluding the alternating current electric machine 20.

Next, FIG. 12 is a conceptual diagram showing a specific example of FIG. 11. In FIG. 12, 11 is a full-bridge type inverter acting as a 3-phase power converter, 111 to 116 are semiconductor switching elements that configure the inverter 11, 21 is an alternating current motor acting as an alternating current electric machine, 40 is a power supply (direct current power supply), and 50 is a capacitor of a direct current voltage unit (hereafter referred to as a main capacitor).

The alternating current electric system is such that, by three phases (U, V, and W phases) of alternating current power supplied to the alternating current motor 21 being controlled by the switching elements 111 to 116 of the inverter 11 being turned on or off, it is possible to regulate the generated torque and rotation speed of the alternating current motor 21.

As this kind of alternating current electric system is publicly known, a detailed description of the circuit configuration and operation will be omitted.

The heretofore described kind of alternating current electric system is such that a problem occurs when the drive of the power converter 10 is stopped. That is, there is a problem in that electromagnetic energy having the previously described reactance component flows into the power converter 10 when the power converter 10 is stopped.

To describe with the alternating current electric system of FIG. 12 as an example, when the drive of the inverter 11 is stopped, that is, when all the switching elements 111 to 116 of the inverter 11 are turned off, the following kind of problem occurs due to electromagnetic energy of the alternating current motor 21 flowing into the inverter 11.

Firstly, the voltage of the main capacitor 50 of the direct current voltage unit rises via a reflux diode in the inverter 11, and when the voltage exceeds the breakdown voltage of the main capacitor 50 or switching elements 111 to 116, those parts are destroyed. Countermeasures such as increasing the capacitance of the main capacitor 50 or raising the breakdown voltage of the main capacitor 50 and switching elements 111 to 116 are effective in avoiding the problem, but all involve an increase in cost, volume, and generated loss, and the like.

In response to this, there is a method whereby a series connection circuit of a semiconductor switching element and resistor (a dynamic braking circuit) is added in series with the main capacitor 50, and the dynamic braking circuit is caused to operate when the voltage applied to the main capacitor 50 becomes excessive, thus suppressing a rise in the voltage of the main capacitor 50. However, this method too is such that, owing to the addition of the dynamic braking circuit, an increase in cost and volume is unavoidable. In particular, it is often the case that the drive of the power converter is stopped when current is flowing only when there is an emergency, and it is markedly uneconomical to provide a dynamic braking circuit only for this purpose.

Next, when the alternating current motor 21 is, for example, a permanent magnet synchronous motor (PMSM, hereafter also referred to as a PM motor), it may happen that the no-load induced voltage (induced electromotive force) becomes higher than the voltage of the direct current voltage unit when the motor rotation speed is high, in which case current continues to flow into the direct current voltage unit even after the power converter 10 is stopped. In particular, when a battery is connected as a power supply to the direct current voltage unit, the battery may be destroyed when the current flowing into the direct current voltage unit becomes excessive.

In this case, in order to circumvent a state wherein the current flowing into the direct current voltage unit becomes excessive, it is conceivable that a direct current switch is provided between the battery and power converter, and the direct current switch is shut off. However, when current is flowing into an alternating current electric machine (the PM motor in the example), the electromagnetic energy of the reactance component still flows into the main capacitor 50, as a result of which an overvoltage is applied to the main capacitor 50.

Also, besides the inverter 11 shown in FIG. 12, a semiconductor switching element through which current flows in two directions and which can be shut off, like, for example, a matrix converter, may be connected to the alternating current electric machine 20 as the power converter 10 configuring the alternating current electric system. The matrix converter is such that, when put into a state wherein there is no possibility of current flowing in either direction by the switching element being turned off, the electromagnetic energy of the reactance component has nowhere to go, as a result of which an excessive voltage is momentarily applied to the switching element, and the switching element may be destroyed.

Herein, FIG. 13 is a waveform diagram showing the result of a simulation when the drive of the inverter 11 is stopped in the alternating current electric system of FIG. 12. With a PM motor being used as the alternating current motor 21, FIG. 13 shows the behavior of the voltage, current, and the like when the drive of the inverter 11 is stopped at a time $t_1$ in a state in which the inverter 11 is carrying out a regeneration operation (a state in which power generated by the PM motor is being supplied to the inverter 11 side).

According to FIG. 13, an originally 400V voltage of the direct current voltage unit (an inverter direct current voltage in the drawing) rises to 800V from the time $t_1$ onward. Because of this, when the breakdown voltage of the main capacitor 50 is lower than 800V, the main capacitor 50 is destroyed.

This kind of phenomenon occurs when current cannot be caused to flow from the inverter 11 side into the power supply 40 after the drive of the inverter 11 is stopped in the configuration of FIG. 12.

For example, when the power supply 40 is configured of a battery 41 and a relay connection point (hereafter referred to as a direct current switch) 42 of a direct current relay, as shown in FIG. 14, it is no longer possible for current caused by regenerative power from the PM motor to be caused to flow into the battery 41 via a reflux diode of the inverter 11, and an overvoltage is applied to the main capacitor 50.

FIG. 15 is a waveform diagram showing the result of a simulation when the drive of the inverter 11 is stopped in the alternating current electric system of FIG. 14, and is a case wherein a simulation of a flow of current into the power supply 40 is carried out.

With this simulation, there is a calculation of the behavior of the system when the PM motor is caused to rotate at high speed, the no-load induced voltage becomes higher than the voltage of the direct current voltage unit, the drive of the inverter 11 is stopped at the time $t_1$ at which the inverter 11 is carrying out a regeneration operation, and the direct current switch 42 is shut off at a subsequent time $t_2$.

According to FIG. 15, from the time $t_1$ at which the drive of the inverter 11 is stopped onward, a current larger than that up to the time $t_1$ flows into the battery 41, as shown by reference sign d, and when the current resistance of the battery 41 is lower than the value of this current, there is concern that the battery 41 will be destroyed.

Also, as the voltage of the direct current voltage unit rises considerably from the time $t_2$ at which the direct current switch 42 is shut off onward, the breakdown voltage of the main capacitor 50 becomes a problem.

As one method of resolving the heretofore described problem, there is heretofore known technology disclosed in PTL 1.

The heretofore known technology of PTL 1 is such that when a main switch (corresponding to the direct current switch 42 in FIG. 14) of a circuit is opened for some reason, all the upper arm or lower arm switching elements of an inverter are put into an on-state, thus short-circuiting a motor stator coil, and avoiding a flow of electromagnetic energy from the motor into the inverter.

Because of this, it is possible to prevent a flow of an excessive current into the power supply side, or an overvoltage being applied to the main capacitor.

CITATION LIST

Patent Literature
PTL 1: JP-A-9-47055 (Paragraphs [0024] to [0034], FIG. 1, FIG. 2, and the like)

SUMMARY OF INVENTION

Technical Problem

The heretofore known technology disclosed in PTL 1 has the following kinds of problem.

(1) As the heretofore known technology is such that an excessive current continues to flow due to the motor being short-circuited, overheating of the motor or demagnetization of the permanent magnet may occur.

(2) As the heretofore known technology is such that the attenuation of the excessive current flowing due to the short-circuiting of the motor depends on the deceleration of the motor, a considerable time is normally needed until the excessive short-circuit current attenuates. Also, when the drive of the inverter is stopped, that is, all the switching elements are turned off, before the motor decelerates sufficiently, electromagnetic energy accumulated in the reactance component flows into the inverter because of the excessive short-circuit current.

A rise in the voltage of the main capacitor is particularly liable to be a problem when the capacitance of the main capacitor is small. For example, it is often the case that a film capacitor with a comparatively small capacitance with respect to volume is used in an electric vehicle inverter for a reason such as extending lifespan, because of which a rise in the voltage of the main capacitor is a particular problem.

Therefore, an object of the invention, in an alternating current electric system including an alternating current electric machine, a power converter, and a control device thereof, is to prevent or suppress a flow of electromagnetic energy of a reactance component into the power converter side when the drive of the power converter is stopped, thus preventing the occurrence of an overvoltage or overcurrent, and increasing the safety of the system.

Solution to Problem

In order to resolve the heretofore described problems, the invention is an alternating current electric system including an alternating current electric machine, a power converter that exchanges power with the alternating current electric machine, and a control device thereof, wherein an operation essentially putting electric terminals of the alternating current electric machine into an opened state, or putting an electric terminal into a conductive state via a reflux diode inside the power converter, is carried out when current flowing through each electric terminal of the alternating current electric machine reaches the vicinity of zero. Herein, the point at which the current flowing through each electric terminal of the alternating current electric machine reaches the vicinity of zero is acquired using a detected current value or the value of a projected current calculation.

Also, in order to cause the current flowing through the electric terminals to reach the vicinity of zero, it is sufficient to cause current to flow back using the lower arm or upper arm switching elements and reflux diodes of the power converter, thereby short-circuiting a plurality of the electric terminals of the alternating current electric machine.

Advantageous Effects of Invention

According to the invention, by an operation putting the electric terminals of the alternating current electric machine into an opened state, or putting an electric terminal into a conductive state via the interior of the power converter, being carried out when the current flowing through each electric terminal of the alternating current electric machine reaches the vicinity of zero, a flow of electromagnetic energy of the reactance component of the alternating current electric machine, or the like, from the alternating current electric machine into the power converter side when the drive of the power converter is stopped is prevented or suppressed. Because of this, the occurrence of an overvoltage or overcurrent is prevented, and it is thus possible to protect the power converter and power supply, and increase the safety of the alternating current electric system.

BRIEF DESCRIPTION OF DRAWINGS

FIG. 15 is a waveform diagram showing the result of a simulation with the alternating current electric system of FIG. 14 as a subject.

DESCRIPTION OF EMBODIMENTS

Hereafter, based on the drawings, a description will be given of embodiments of the invention.

Figure 12:
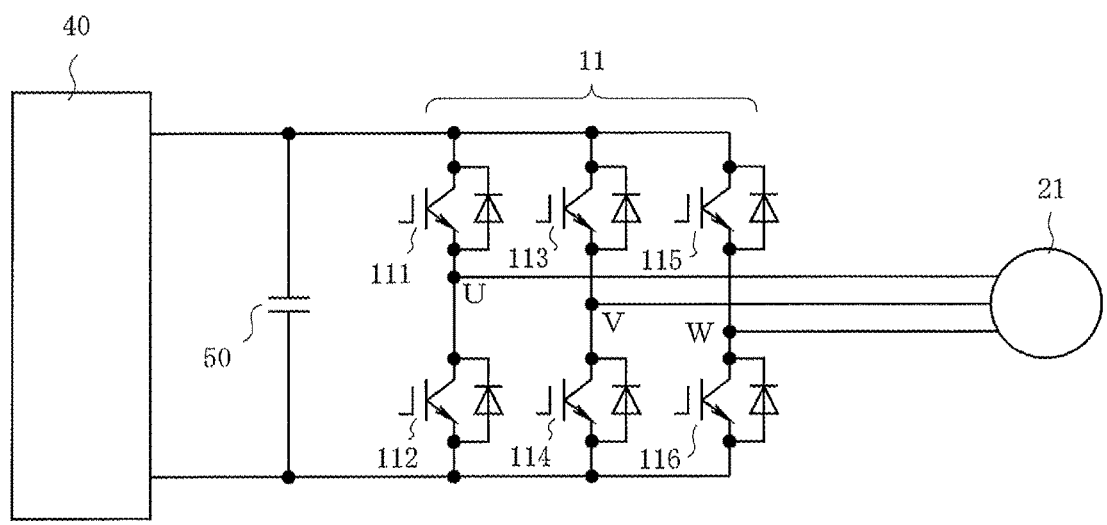
FIG. 12 is a conceptual diagram showing a specific example of FIG. 11.
Figure 12:
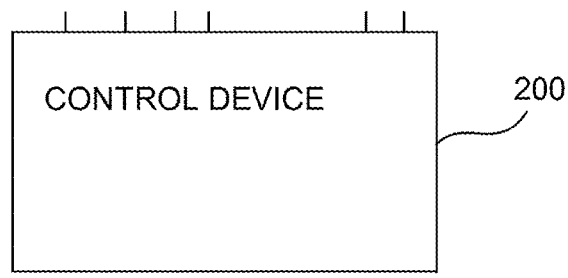

Firstly, a description will be given of embodiments of the invention corresponding to a first embodiment (in which an alternating current electric system has an alternating current electric machine, a power converter that is connected to a plurality of electric terminals of the alternating current electric machine and that exchanges power with the alternating current electric machine, and a control device (see control device 200 of FIGS. 2, 4, and 12) that controls semiconductor switching elements that configure the power converter, with this alternating current electric system being characterized by including current information acquisition means for acquiring a point at which current flowing through each electric terminal of the alternating current electric machine is in the vicinity of zero, wherein, when the current information acquisition means acquires the point in a converter transition period for transitioning from a converter operation period in which power is exchanged between the power converter and alternating current electric machine to a converter stop period in which no exchange of power is carried out, an operation putting the electric terminals into an opened state, or putting the relevant electric terminal into a conductive state via a rectifying element inside the power converter, is carried out by the control device 200 for all the electric terminals) and a second embodiment (in which an alternating current electric system control method for an alternating current electric system having an alternating current electric machine; a power converter that is connected to a plurality of electric terminals of the alternating current electric machine and that exchanges power with the alternating current electric machine; and a control device 200 that controls semiconductor switching elements that configure the power converter, is characterized in that in a converter transition period for transitioning from a converter operation period in which power is exchanged between the power converter and alternating current electric machine to a converter stop period in which no exchange of power is carried out, an operation opening the relevant electric terminal, or putting the relevant electric terminal into a conductive state via a rectifying element inside the power converter, is carried out for all the electric terminals at a point at which current flowing through each electric terminal of the alternating current electric machine reaches the vicinity of zero). Although these embodiments are applied to, for example, the 3-phase alternating current electric systems shown in FIG. 12 and FIG. 14, the embodiments are also applicable when the number of phases of an alternating current electric system exceeds three.

When a 3-phase alternating current is a balanced sinusoidal wave in a 3-phase system, power is theoretically constant in a steady state. Although it is rarely the case in an actual system that the alternating current is strictly a 3-phase balanced sinusoidal wave, it is basically often the case that the system is established assuming a 3-phase balanced sinusoidal wave, and this concept is also adopted in the following description.

Figure 14:
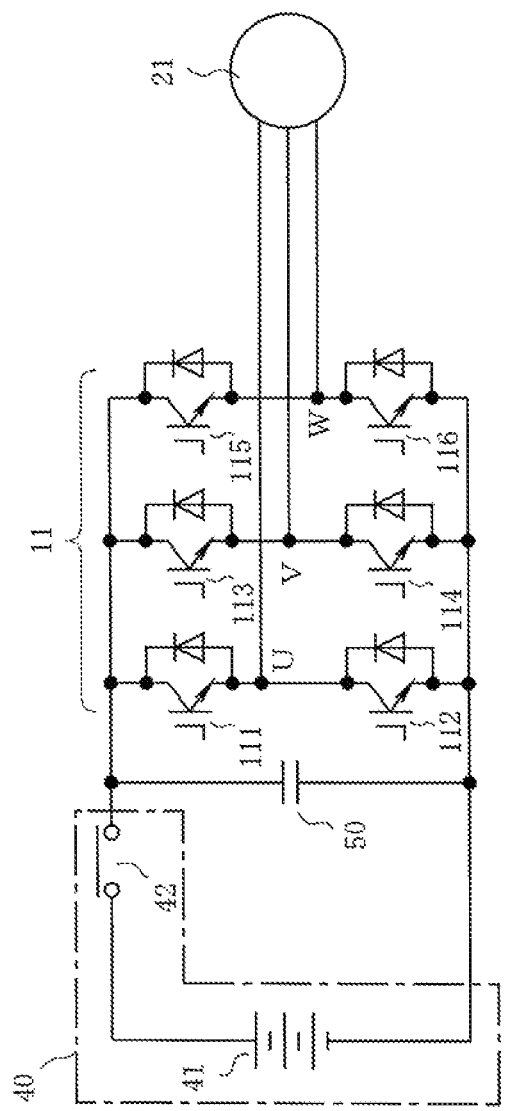
FIG. 14 is a circuit diagram showing a specific example of the alternating current electric system of FIG. 12.

That is, the kind of 3-phase alternating current electric system shown in FIG. 14 is such that, when simultaneously stopping the three phases of the drive of an inverter 11, and provided that the power of each phase has equivalent conditions when stopping, the reactance component of an alternating current motor 21, or the like, invariably has electromagnetic energy regardless of at which point the inverter 11 is stopped, the electromagnetic energy flows into the inverter 11 side, and the previously described kind of problem occurs.

Therefore, this embodiment is such that a flow of the electromagnetic energy of the reactance component of the alternating current motor 21, or the like, into the inverter 11 side is suppressed by controlling the timing at which the switching element of each phase of the inverter 11 is turned off.

That is, when individually examining the three phases of current of the alternating current motor 21, each phase of current is an alternating current, because of which an instant at which the current becomes zero invariably occurs once in a half-cycle. Focusing on this point, the embodiment is such that, when the current reaches the vicinity of zero in each individual phase, the upper and lower arm switching elements of the inverter 11 in the relevant phase are put into an off-state, and this is carried out sequentially for all three phases.

Provided that the current flowing in each phase is zero, the electromagnetic energy of the reactance component of the relevant phase is zero, because of which, by an operation turning off the switching elements of the relevant phase being carried out, it is possible to prevent or suppress a flow of electromagnetic energy from the alternating current motor 21 into the inverter 11 side.

Figure 1:
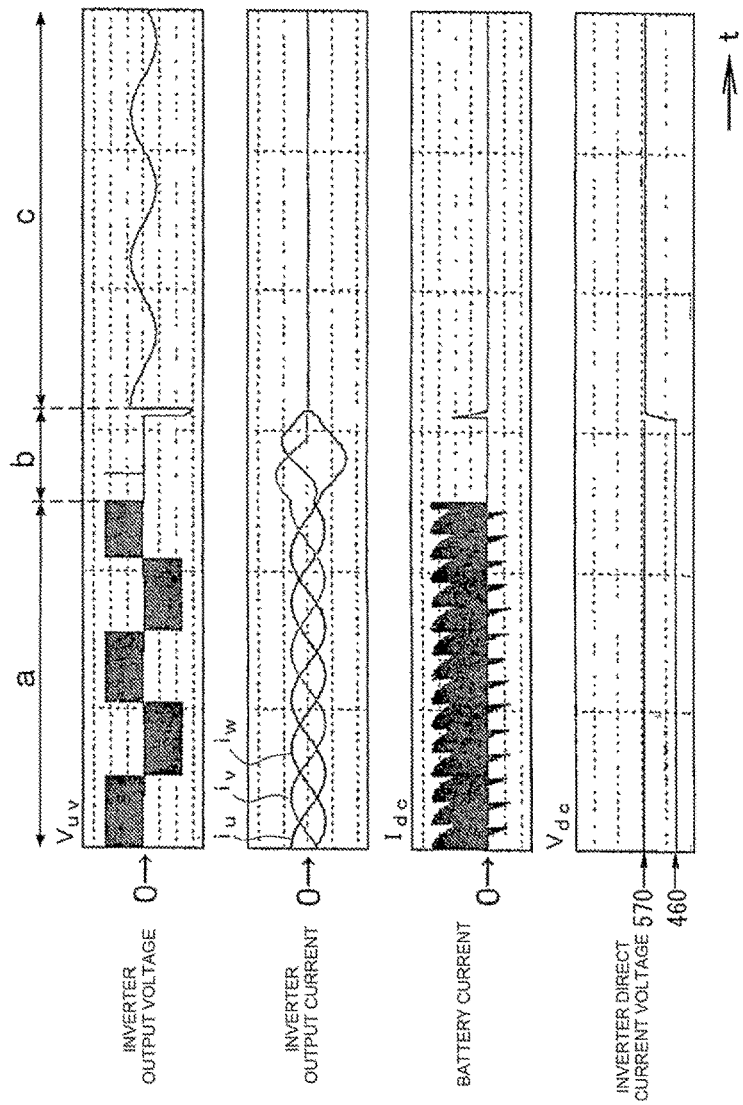
FIG. 1 is a waveform diagram showing operations of an embodiment of the invention.

Herein, FIG. 1 is a waveform diagram showing operations of the embodiment.

In FIG. 1, period a is a period in which the inverter 11 carries out a regeneration operation, that is, a period in which the alternating current motor 21 is caused to carry out a regenerative drive, and the power generated thereby is controlled by the inverter 11 (hereafter also called a converter operation period), period b is a period in which the upper and lower arm switching elements are collectively, sequentially turned off from a point at which the current in each phase of the inverter 11 reaches zero (hereafter also called a converter transition period), and period c is a period in which the drive of the inverter 11 is completely stopped (hereafter also called a converter stop period).

In the waveforms of FIG. 1, $V_{uv}$ is a line voltage between U and V phases, $i_u$, $i_v$, and $i_w$ are output currents of U, V, and W phases, $i_{dc}$ is a direct current flowing through a battery 41 of FIG. 14, and $V_{dc}$ is a direct current voltage of the inverter 11 (voltage of a direct current voltage unit).

According to FIG. 1, the output currents of the inverter 11 flowing into the alternating current motor 21 in period b are increased beyond those in period a, but the flow of current into the battery 41 is zero. Also, while the direct current voltage of the inverter 11 in periods a and b is 460V, the direct current voltage in period c is 570V, and the voltage applied to a main capacitor 50 decreases considerably in comparison with heretofore known technology of FIG. 13, because of which it is possible to reduce the breakdown voltage of the main capacitor 50.

Figure 2:
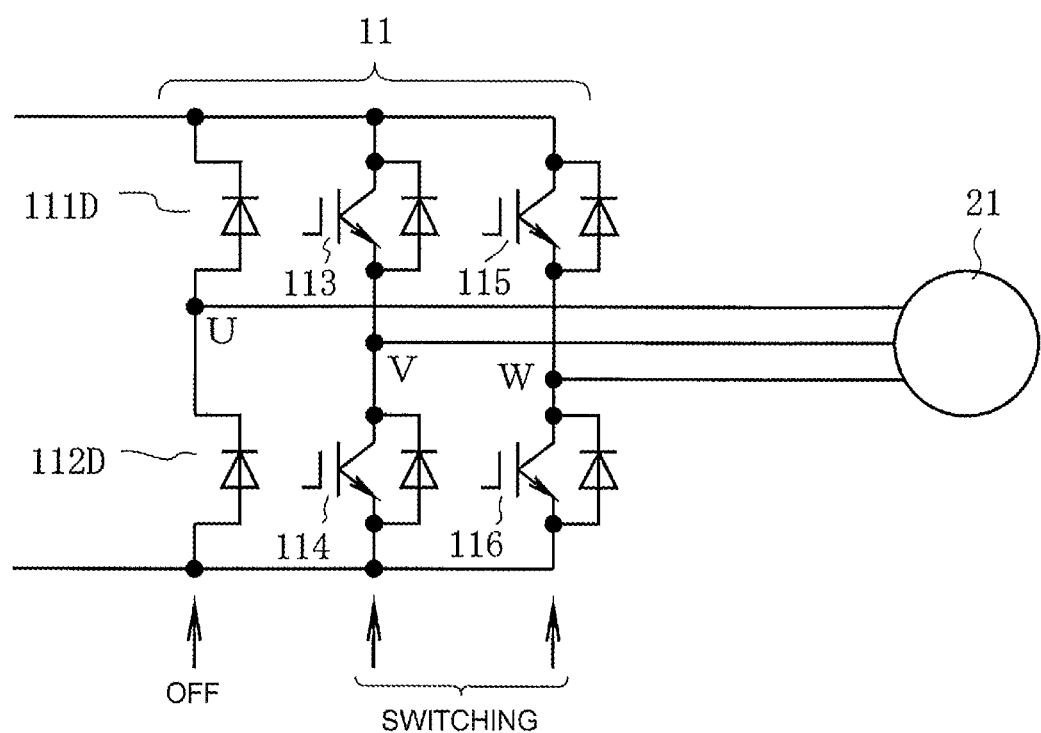
FIG. 2 is a configuration diagram of a main portion of an alternating current electric system in an embodiment of the invention.
Figure 2:
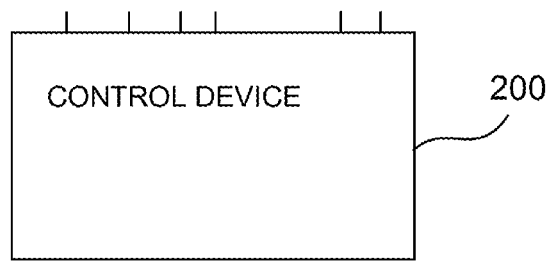

Next, FIG. 2 is a configuration diagram of a main portion of the alternating current electric system in this embodiment.

FIG. 2 shows a state wherein the upper and lower arm switching elements are collectively turned off in one phase (for example, the U phase) of the full-bridge type inverter 11 shown in FIG. 14. In FIG. 2, 111D and 112D are reflux diodes of the U phase.

When the upper and lower arm switching elements of the U phase of the inverter 11 are collectively turned off, the state is such that, as shown in FIG. 2, an electric terminal of the alternating current motor 21 can have continuity with the U phase via only the reflux diodes 111D and 112D. Consequently, for as long as the voltage from the U phase to the other phases is lower than the voltage of the direct current voltage unit, the U phase is an open state, and no current flows. Also, even when the voltage from the U phase to the other phases is higher than the voltage of the direct current voltage unit, current flows only for a period in which that size relationship is maintained, because of which it is possible to suppress the current flowing with respect to a time of normal operation.

Herein, a description has been given with the full-bridge type inverter 11 as an example, but the invention, not being limited to this, is also applicable to other kinds of power converter.

For example, a matrix converter is also such that, at a point at which the current in a certain phase reaches the vicinity of zero, the switching elements of the relevant phase can be turned off. In this case, the relevant phase is essentially in an open state, which is different from a state wherein continuity is possible via only reflux diodes, as previously described. As is clear from the descriptions of the first and second embodiments, the invention encompasses a case of using not only an inverter but also a matrix converter as a power converter.

Figure 3:
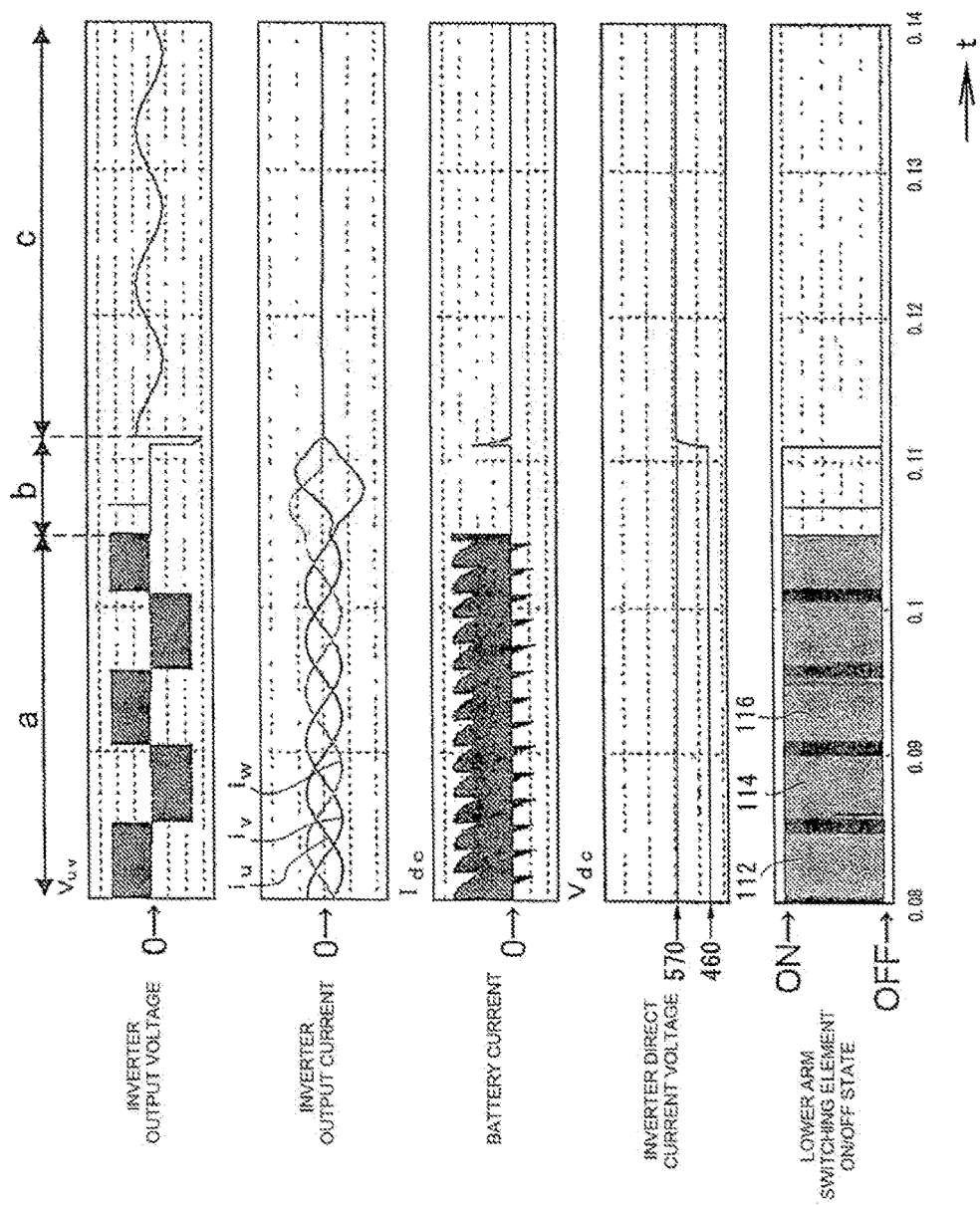
FIG. 3 is a waveform diagram showing operations of an embodiment of the invention.

Next, FIG. 3 is a waveform diagram showing operations corresponding to a third embodiment in which the alternating current electric system control method according to the second embodiment is further characterized in that, as an operation of the power converter in the converter transition period, a state wherein the current flowing through the electric terminals reaches the vicinity of zero is created by an operation short-circuiting the plurality of electric terminals of the alternating current electric machine.

In FIG. 3, in the same way as previously described, period a is a converter operation period, period b is a converter transition period, and period c is a converter stop period. FIG. 3 shows an aspect wherein, when transitioning from period a to period b, the current of the alternating current motor 21 is caused to flow back by the electric terminal of each phase of the alternating current motor 21 being short-circuited (this operating mode is called a reflux mode), after which a predetermined switching element operation described hereafter is carried out in period b.

When the electric terminal of each phase of the alternating current motor 21 is short-circuited, power no longer flows from the alternating current motor 21 via the inverter 11 into the battery 41 side, and as the short-circuit current at the time is an alternating current, it invariably alternates, that is, an instant at which the current reaches zero occurs. Consequently, it is possible to carry out an operation whereby, at the point at which the output current of each phase of the inverter 11 reaches zero, the upper and lower arm switching elements of the relevant phase are turned off, as previously described.

Means for short-circuiting the electric terminal of each phase of the alternating current motor 21 and causing current to flow back can be realized by, for example, controlling the on and off-states of the switching elements of the inverter 11, or by adding a dedicated circuit. In the example of FIG. 3, the electric terminal of each phase of the alternating current motor 21 is short-circuited by lower arm switching elements 112, 114, and 116 of the inverter 11 all being turned on.

Figure 4:
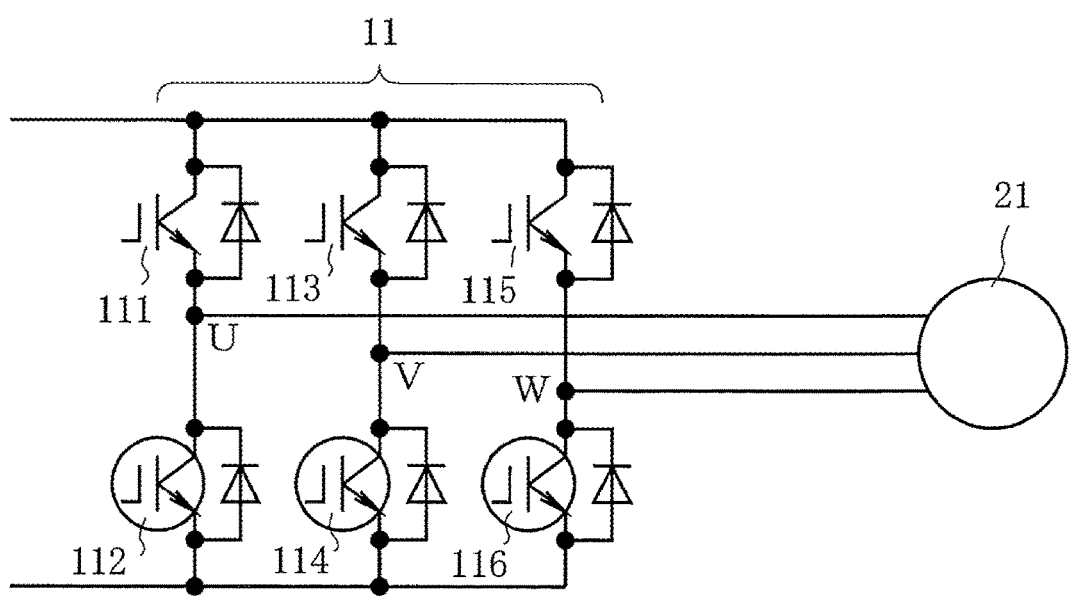
FIG. 4 is a configuration diagram of a main portion of an alternating current electric system in an embodiment of the invention.
Figure 4:
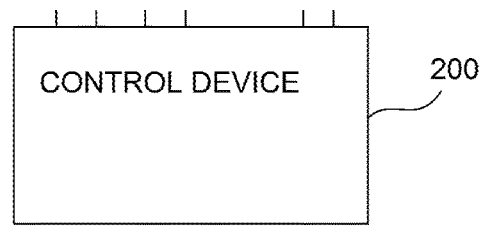

Next, FIG. 4 is an illustration of a main portion when short-circuiting the electric terminal of each phase of the alternating current motor 21 and causing current to flow back in the full-bridge type inverter 11, and corresponds to a fourth embodiment in which an alternating current electric system control method according to the third embodiment is further characterized in that the power converter is a full-bridge type inverter, and the operation short-circuiting the electric terminals is carried out by causing current to flow back using semiconductor switching elements that configure the inverter and reflux diodes connected in anti-parallel with the switching elements.

When driving the alternating current motor 21 using the full-bridge type inverter 11, it is possible to short-circuit the electric terminal of every phase of the alternating current motor 21 by putting all upper arm switching elements 111, 113, and 115 or all the lower arm switching elements 112, 114, and 116 of the inverter 11 into an on-state. In FIG. 4, all the lower arm switching elements 112, 114, and 116 enclosed with a circle are in an on-state.

As the technology itself of short-circuiting the electric terminals of a load connected to the inverter 11 by putting all the upper arm or lower arm switching elements of the inverter 11 into an on-state in this way is publicly known, a detailed description will be omitted.

Figure 5:
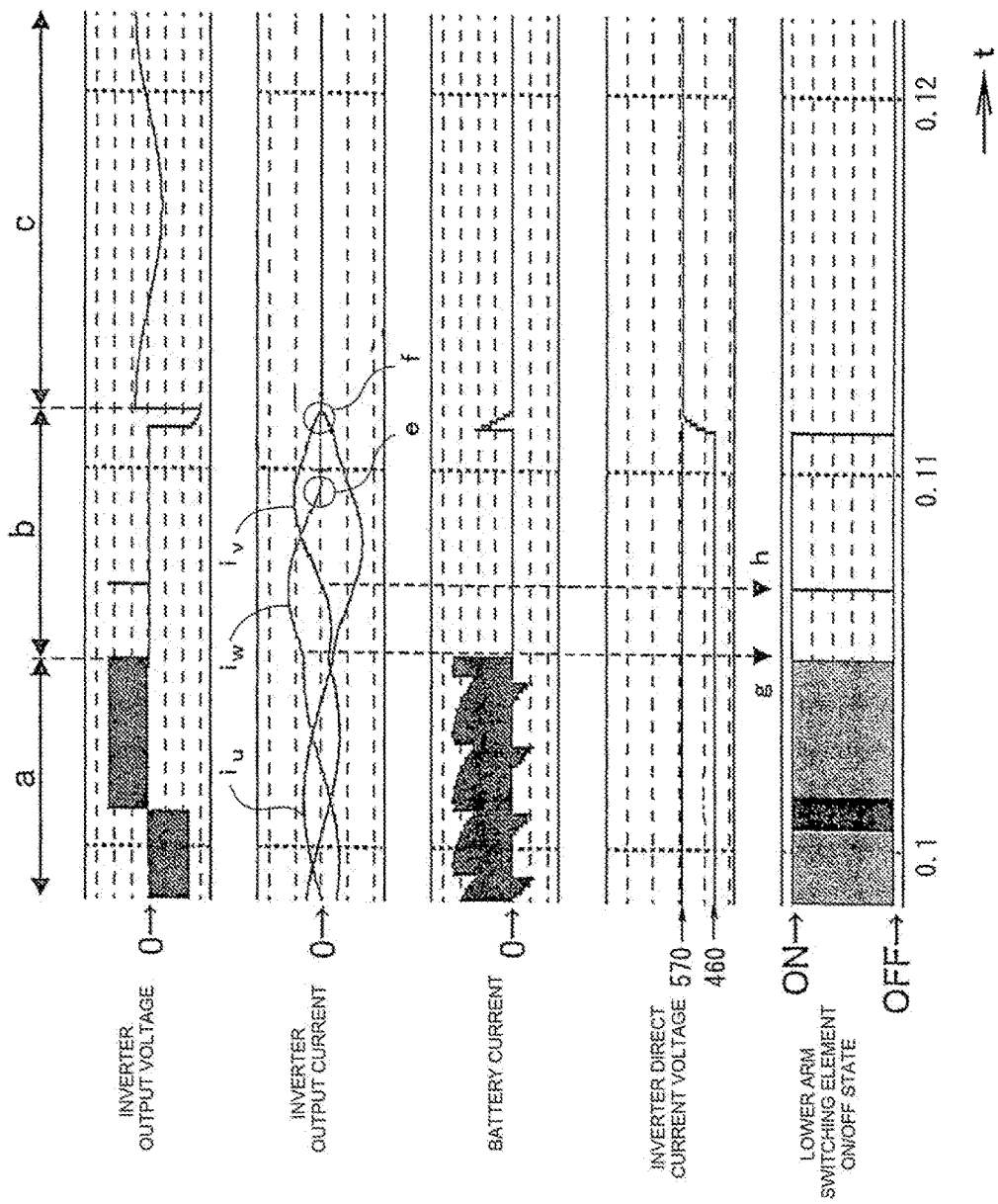
FIG. 5 is a waveform diagram showing operations of an embodiment of the invention.

FIG. 5 is a waveform diagram showing operations of a fifth embodiment in which an alternating current electric system control method according to the third embodiment is further characterized in that in the converter transition period, when the direction of the current flowing through each electric terminal is a forward direction from the power converter toward the alternating current electric machine, or when the size of the current flowing through each electric terminal is within a range from a predetermined negative value to zero, the upper and lower arm semiconductor switching elements of the power converter connected to the relevant electric terminal are put into an off-state and the state maintained, when the size of the current flowing through each electric terminal is equal to or lower than the predetermined negative value, the upper arm switching element connected to the relevant electric terminal is put into an off-state and the lower arm switching element is put into an on-state, and an operation putting the lower arm switching element into an off-state is carried out at the point at which the current flowing through the relevant electric terminal reaches the vicinity of zero.

In this embodiment, all the lower arm switching elements 112, 114, and 116 are put into an on-state and all the upper arm switching elements 111, 113, and 115 are put into an off-state, as shown in FIG. 4, in the converter operation period a, after which the converter transition period b is started.

As each phase of the alternating current motor 21 is short-circuited in period b because of this operation, the comparatively large short-circuit currents $i_u$, $i_v$, and $i_w$ flow back through the alternating current motor 21 and lower arm switching elements 112, 114, and 116 due to magnetic energy caused by voltage generated from the alternating current motor 21 and current flowing through the reactance component of the alternating current motor 21.

Herein, when the lower arm switching elements 112, 114, and 116 are configured of, for example, an active switching element such as an IGBT and a reflux diode connected in parallel with the active switching element, no current is flowing through the parallel-connected active switching element when current is flowing through the reflux diode. In this kind of state, the relevant active switching element is put into an off-state. There is essentially no change in the short-circuit current caused by this operation.

By this kind of operation being carried out, the current flowing through the reflux diode in the relevant phase decreases, and as the active switching element connected in parallel with the reflux diode is in an off-state at the point at which the current presently reaches zero, the current is maintained at zero. Because of this, with regard to the relevant phase, an operation whereby the switching element is turned off in a state wherein the current is zero is realized.

Also, even when current is flowing through an active switching element, the relevant active switching element is turned off when the value of the current reaches zero, or a predetermined value or lower. Herein, it is sufficient that an index for determining the predetermined value is the flow of current from the alternating current motor 21 into the inverter 11 caused by the active switching element being turned off, or the voltage of the direct current voltage unit that rises due to the inflow of current, reaching an allowable value or lower.

A reference sign e in FIG. 5 indicates the point at which the W phase current $i_w$ reaches zero, while a reference sign f indicates the point at which the U phase current $i_u$ and V phase current $i_v$ reach zero. Also, a reference sign g indicates that at that point the lower arm switching element 116 of the W phase through which the positive current $i_w$ is flowing is turned off, while a reference sign h indicates that at that point the lower arm switching element 114 of the V phase through which the positive current $i_v$ is flowing is turned off.

By the heretofore described kind of operation being carried out for each phase, it is possible to cause the switching elements to be turned off at the point at which the current reaches zero.

Figure 13:
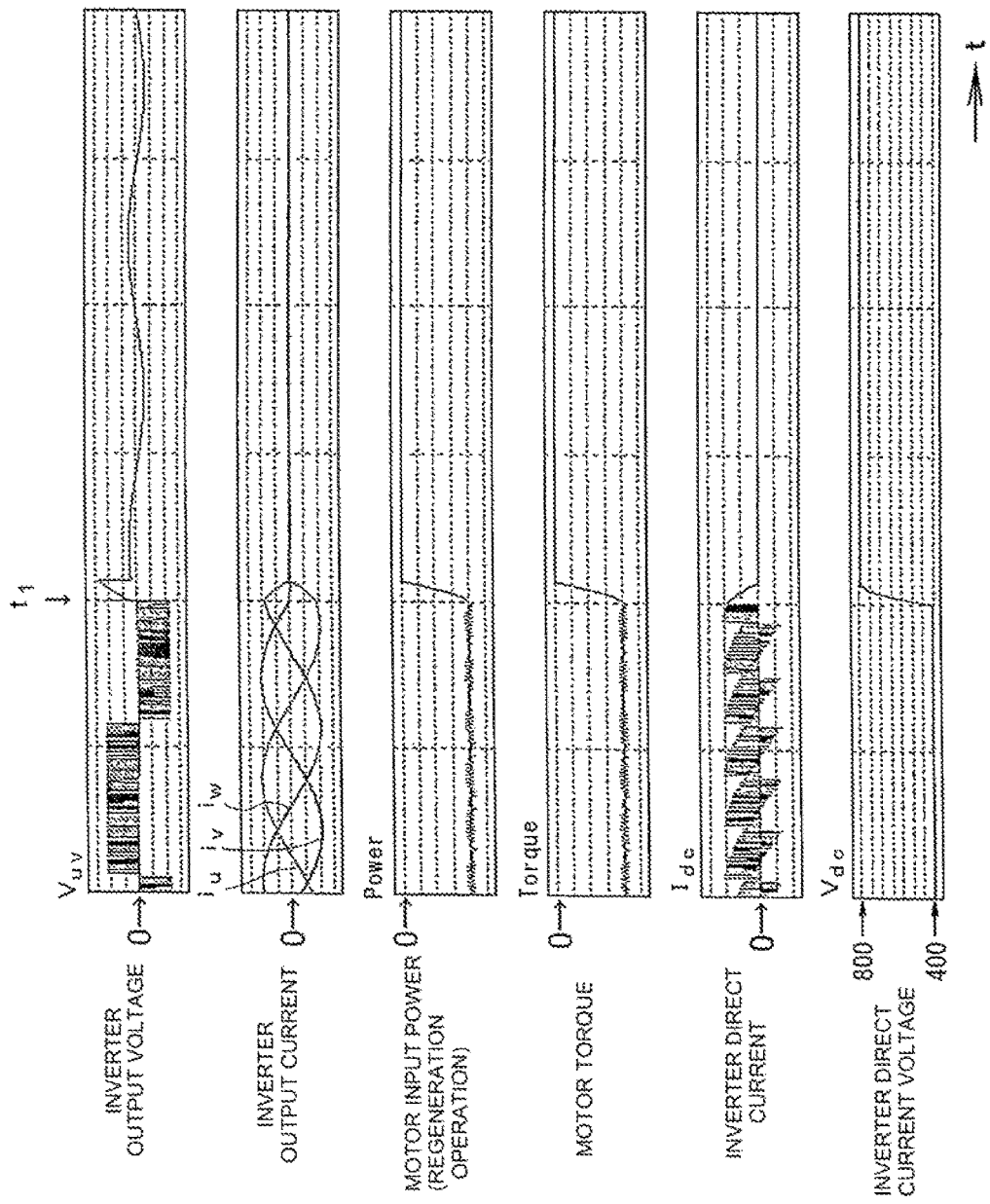
FIG. 13 is a waveform diagram showing the result of a simulation with the alternating current electric system of FIG. 12 as a subject.

According to FIG. 5, although the voltage of the direct current voltage unit rises when switching from the converter transition period b to the converter stop period c, the value thereof is a rise from 460V to 570V, and the kind of rise to the excessive value of 800V shown in FIG. 13 is suppressed.

The voltage rising from 460V to 570V in FIG. 5 is due to the switching elements being turned off in a state wherein the flow of current in the electric terminals of the alternating current motor 21 is continuing. However, owing to the value of the current when the switching elements are turned off being small compared to that in FIG. 13, the rise of the voltage is suppressed, which indicates that the initial advantage of the invention is achieved.

This embodiment too is applicable to an alternating current electric system of four phases or more.

Also, when the lower arm switching element of a first phase (herein called an A phase) of three phases is in an off-state, and when the remaining two phases (called a B phase and C phase) are in a short-circuited state, current flows through the reflux diode of the upper arm switching element of the A phase, even though the lower arm switching element of the A phase is in an off-state, when the potential of the A phase (called a voltage $V_a$) with respect to the terminals of the B phase and C phase is higher than the voltage of the direct current voltage unit of the inverter 11. However, as a period for which this current flows is only a period for which the voltage $V_a$ is higher than the voltage of the direct current voltage unit, and it is often the case that it does not lead to a marked voltage rise, there is no particular problem.

In the above description, a description has been given of operations when operating the lower arm switching elements, but exactly the same operations can also be realized when operating the upper arm switching elements, as described in claim 6.

The heretofore described switching element operation can easily be realized by using a current detector as current information acquisition means in the first embodiment, and detecting the current in each phase of the alternating current motor 21 using the current detector.

Another example of the current information acquisition means can be realized by carrying out a projected calculation of current behavior after short-circuiting using a mathematical model of the alternating current motor 21, based on the state of the alternating current electric system (the amplitude and phase of the current in each phase, the rotation speed of the alternating current motor 21, and the like) at the point at which the short-circuiting operation is started, in accordance with a sixth embodiment in which an alternating current electric system control method according to the fifth embodiment is further characterized in that the operation of each switching element is realized by projecting subsequent system behavior from the state of the system at the point at which the converter transition period starts. This is particularly useful in an alternating current electric system wherein the phase current of the alternating current motor 21 is projected without being detected, and the alternating current motor 21 is driven.

Next, a description will be given of a seventh embodiment in which an alternating current electric system control method according to the fourth or fifth embodiment is further characterized in that a direct current power supply is connected via a direct current switch to a direct current voltage unit of the power converter, and in the converter transition period, the direct current switch is turned off while the plurality of electric terminals of the alternating current electric machine are short-circuited, after which, with regard to the plurality of electric terminals, an operation sequentially reducing the current flowing through each electric terminal to the vicinity of zero and opening the relevant electric terminal at that point, or putting the relevant electric terminal into a conductive state via a rectifying element inside the power converter, is carried out for all the electric terminals. This embodiment relates to, for example, an alternating current electric system having a direct current power supply, such as the battery 41, mounted in an electric vehicle, as shown in FIG. 14.

In FIG. 14, when the drive of the inverter 11 is stopped during energizing of the alternating current motor 21, electromagnetic energy flows into the inverter 11 from the alternating current motor 21, but as the voltage of the direct current voltage unit is clamped by the battery 41, there is essentially no jumping of the direct current voltage. In place of this, however, there is concern that an overcurrent will flow into the battery 41.

As the battery 41 may deteriorate markedly due to the inflow of an overcurrent, it is preferable that this kind of condition is not caused.

Therefore, this embodiment is such that a flow of an overcurrent into the battery 41 is prevented by the following kinds of operation being carried out.

That is, firstly, all the electric terminals of the alternating current motor 21 are short-circuited. As a short-circuiting method, it is sufficient that all the upper arm or lower arm switching elements of the inverter 11 are turned on, as previously described. By so doing, the current flowing through the battery 41 becomes zero, as previously described.

In this state, a direct current switch 42 between the battery 41 and direct current voltage unit is turned off. Although it may happen that a switch that opens and closes a direct current path cannot be turned off in a state in which the current flowing along the path is excessive, the direct current switch 42 can be reliably turned off provided that the current flowing through the battery 41 is in a zero state.

Continuing, at the point at which the current in each phase reaches zero, an operation whereby the switching elements of the relevant phase are sequentially turned off is carried out, as already described.

By so doing, it is possible to suppress a rise in the voltage of the direct current voltage unit, and stop the system safely, while avoiding a flow of an overcurrent into the battery 41.

Next, a description will be given of an eighth embodiment in which an alternating current electric system control method according to the second embodiment is further characterized in that the alternating current electric machine is a permanent magnet synchronous machine, and possibly also in that the power converter is a full-bridge type inverter, and there exists a period in which the linear peak value of the induced electromotive force of the permanent magnet synchronous machine is higher than the voltage of the direct current voltage unit of the inverter.

The technology according to the invention produces a particularly large advantage when the alternating current motor is a PM motor. That is, a PM motor has induced electromotive force (magnetic electromotive force) caused by the magnetic flux of a permanent magnet, and the amplitude thereof is generally proportional to the speed of rotation. Consequently, a comparatively high electromotive force is generated between the terminals of the PM motor in a high-speed rotation region, because of which, when stopping the drive of the power converter while driving the PM motor using a power converter such as an inverter, electromagnetic energy flowing into the power converter from the PM motor has a tendency to increase easily.

An induction motor or wire wound synchronous motor differs from a PM motor in that it is possible to reduce electromotive force by regulating the current when there is high-speed rotation.

Figure 6:
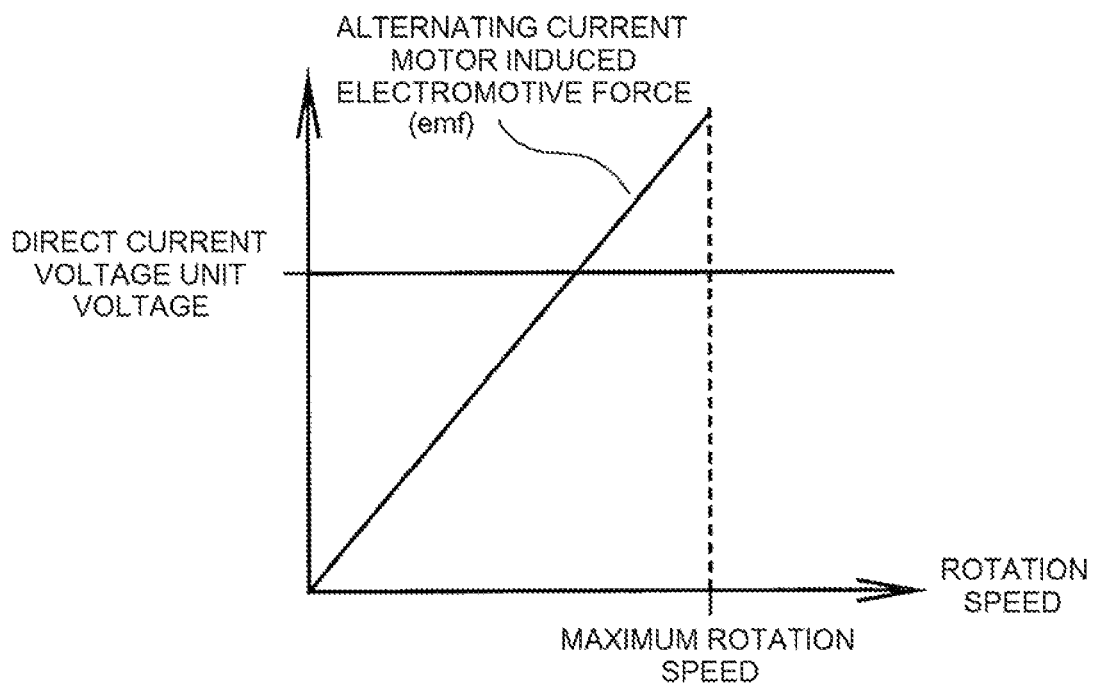
FIG. 6 is a characteristic diagram showing the relationship of induced electromotive force and the voltage of a direct current voltage unit to the rotation speed of an alternating current motor.

Herein, FIG. 6 is a characteristic diagram showing the relationship of induced electromotive force and the voltage of the direct current voltage unit to the rotation speed of an alternating current motor (PM motor).

An alternating current electric system applied to a PM motor is such that, when the linear peak value of the induced electromotive force is higher than the voltage of the direct current voltage unit of the inverter 11 that drives the PM motor, the operational advantage of the invention increases.

As a PM motor has the same structure as a permanent magnet synchronous generator, as is commonly known, the invention is applicable to permanent magnet synchronous machines including the two.

As previously described, induced electromotive force is proportional to rotation speed. Because of this, a system designed so that the induced electromotive force at the maximum rotation speed allowed of the PM motor is higher than the direct current voltage unit of the inverter 11 is such that when the direct current voltage is maintained at a practically constant value by, for example, the battery 41, current continues to flow from the PM motor even after the drive of the inverter 11 is stopped, regardless of the size of the electromagnetic energy of the PM motor immediately before the inverter 11 stops. Because of this, there is concern that the battery 41 will overheat or be damaged by the heretofore mentioned current.

Also, even when the battery 41 is not connected to the direct current voltage unit, the motor terminal voltage when stopping is intrinsically high, because of which current flowing into the direct current voltage unit is liable to increase, and the need to suppress this current is high.

Consequently, by applying the invention, particularly in an alternating current electric system wherein the battery 41 is connected to the direct current voltage unit, it is possible to prevent a continuous flow of current into the battery 41. Also, it is possible to suppress a flow of an overcurrent into the direct current voltage unit in an application other than this kind of alternating current electric system.

As the heretofore described problem of the voltage of the direct current voltage unit rising exists in an alternating current electric system in which a PM motor is used, it is often the case that it is necessary, in terms of safety, to design the induced electromotive force of the PM motor to be low, and in an extreme case, lower than the voltage of the direct current voltage unit. This means that the current necessary increases when causing the motor to do the same amount of work, and the current value increasing leads to an increase in the capacitance of the inverter and cable for driving, which is uneconomical, and leads to an increase in the dimensions and mass of the inverter.

These problems form a considerable obstacle when applying the alternating current electric system to various kinds of industry, an electric vehicle, or the like. Consequently, by using the invention to resolve the problem of the voltage of the direct current voltage unit rising excessively, it is possible to eliminate the heretofore described obstacle, and thus possible to considerably promote economic efficiency, and a reduction in size and weight, of the alternating current electric system.

Next, a description will be given of a ninth embodiment in which an alternating current electric system control method according to the eighth embodiment is further characterized in that the permanent magnet synchronous machine is configured so that an internal permanent magnet is not irreversibly demagnetized by current flowing due to short-circuiting of the electric terminals of the synchronous machine.

As is clear from FIG. 1, FIG. 3, and FIG. 5, the invention is such that a large current momentarily flows through a stator coil of the alternating current motor 21 in the converter transition period b. Generally, a phenomenon known as irreversible demagnetization occurs in a permanent magnet. This is a phenomenon whereby, when a large magnetic flux acts in a direction such as to demagnetize the permanent magnet, the magnetization of the permanent magnet weakens irreversibly, and does not return to the original state unless magnetization is carried out again.

A PM motor is such that magnetic flux is generated when current flows through the stator coil and, depending on the position of the rotor, the magnetic flux generated from the stator coil may act in a direction such as to demagnetize the permanent magnet. That is, depending on the value of the current flowing through the coil of the PM motor, the permanent magnet in the PM motor may be irreversibly demagnetized, because of which the PM motor becomes unable to produce the desired characteristics.

In order to avoid the heretofore described irreversible demagnetization, it is necessary to, for example, increase the amount of the permanent magnet or modify the structure of the PM motor, and it is preferable that these measures are considered from the PM motor design stage.

That is, in order to guarantee the safety of the whole alternating current electric system, there may occur a need to drive the system again after the system is safely stopped by applying the invention. In this case, it is sufficient to design the motor so that the permanent magnet is not irreversibly demagnetized, using the heretofore described kinds of method.

For an application wherein a certain amount of irreversible demagnetization is not a problem, it is also possible to design so that irreversible demagnetization is carried out in the PM motor, utilizing the overcurrent that flows momentarily in the converter transition period b.

That is, by irreversible demagnetization being carried out, it is generally possible to reduce the amount of the permanent magnet, or lower the grade of the permanent magnet, with respect to when irreversible demagnetization is not allowed, because of which it is possible to reduce the cost of the PM motor. Also, as the induced electromotive force decreases owing to the irreversible demagnetization, electromagnetic energy flowing into the inverter side from the PM motor decreases, and the current flowing in the converter transition period b decreases, because of which it is possible to suppress heat generation by the PM motor and inverter.

Next, a description will be given of a tenth embodiment in which an alternating current electric system control method for an alternating current electric system has an alternating current electric machine; a power converter, connected to a plurality of electric terminals of the alternating current electric machine, that exchanges power with the alternating current electric machine; and a control device that controls semiconductor switching elements that configure the power converter, with this control method being characterized in that in a converter transition period for transitioning from a converter operation period in which power is exchanged between the power converter and alternating current electric machine to a converter stop period in which no exchange of power is carried out, energy being supplied from the alternating current electric machine to the power converter is prevented or suppressed by the switching elements being controlled, and there is a transition to the converter stop period before the energy of a mechanical energy source that drives the alternating current electric machine is caused to be consumed, reducing the energy to a safe level.

The technological idea corresponding to the superordinate concept of each of the heretofore described embodiments is as follows.

That is, in the converter transition period b, the flow of energy from an alternating current electric machine such as the alternating current motor 21 into the power converter is prevented or suppressed by an operation of a power converter such as the inverter 11, and without causing the energy of a mechanical energy source that drives the alternating current electric machine to be consumed and waiting for the electromagnetic energy to attenuate to a safe level, in other words, without waiting for the alternating current electric machine to drop to a safe speed level, the power converter is stopped safely.

For example, when the alternating current electric system of the invention is applied to a transportation device having wheels, or the like, it is possible to suppress the flow of energy from the alternating current electric machine into the power converter by controlling the switching elements of the power converter to short-circuit the coils of the alternating current electric machine. However, when this state is continued, kinetic energy of the transportation device, in principal, is consumed inside the alternating current electric machine by coil resistance loss, core iron loss, or frictional force, and it is necessary to wait to stop the drive of the converter until the vehicle decelerates to a speed level such that there is no problem when stopping the converter. That is, it is necessary to continue the short-circuited state of the alternating current electric machine for an extremely long time, and there is an extremely high possibility of the alternating current electric machine and power converter being destroyed by overheating. When designing the alternating current electric system so as to avoid this problem, the system becomes over-engineered, and the overall mass, dimensions, and cost increase.

Therefore, according to the invention, it is possible to safely stop the system by appropriately manipulating the timing of controlling the switching elements of the power converter in the previously described converter transition period b, without short-circuiting the alternating current electric machine for a long period, in other words, without waiting for the alternating current electric machine to decelerate to a safe level.

A power converter, in general, operates in such a way that when an overcurrent is detected, all the switching elements of the power converter are shut off at one time. This kind of operation is called an "overcurrent trip".

However, the invention is inconsistent with an "overcurrent trip" in that there is not an immediate transition to a shutting off operation when an overcurrent is detected. Consequently, when applying the invention, it is necessary to stop the overcurrent trip function. As the electromagnetic energy generated from the alternating current electric machine is also relatively small when the rotation speed and current of the alternating current electric machine are smaller than predetermined values, activating the overcurrent trip function and applying the invention when the rotation speed and current exceed the predetermined values can also be considered as one method.

Figure 7:
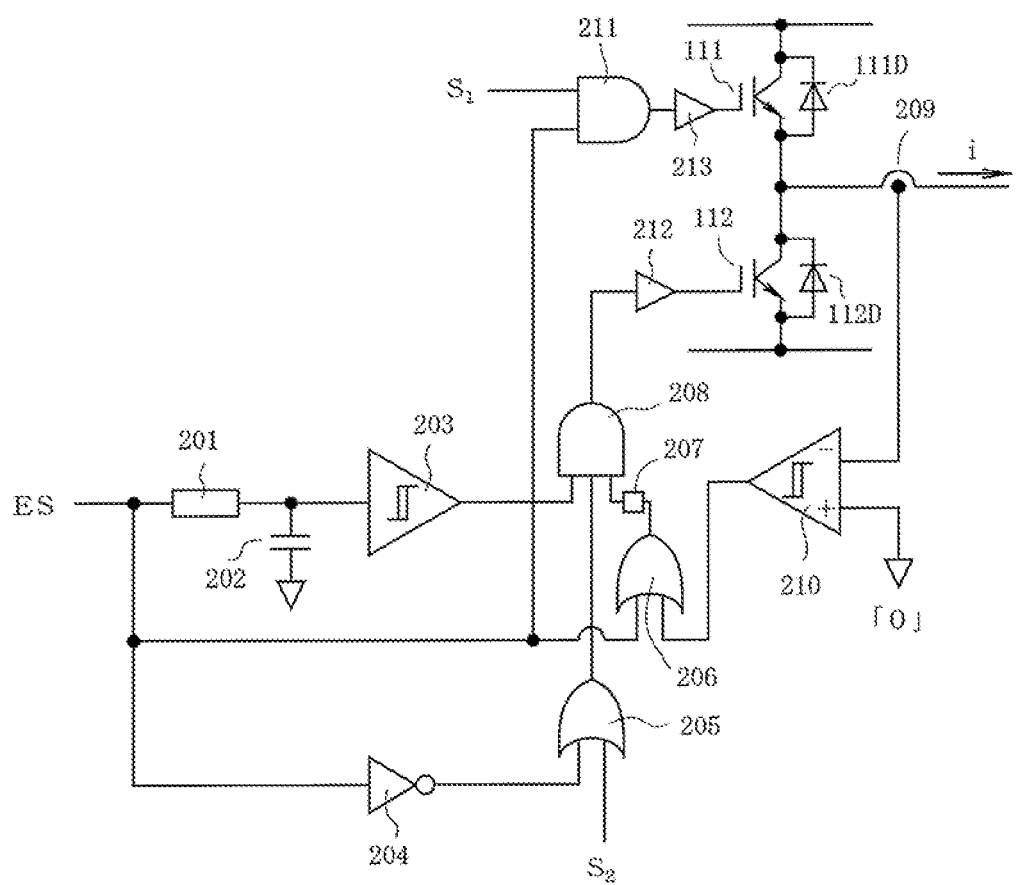
FIG. 7 is a circuit diagram showing logic of a control device in embodiments of the invention.

Next, FIG. 7 is a circuit diagram showing logic for realizing the embodiments of the invention.

In FIG. 7, 201 is a resistor, 202 is a capacitor, 203 is a waveform shaper circuit, 204 is a NOT gate, 205 and 206 are OR gates, 207 is a zero latch circuit, 208 and 211 are AND gates, 209 is a current detector acting as the previously described current information acquisition means, 210 is a comparator, and 212 and 213 are amplifiers. Also, as previously described, 111 is, for example, the upper arm switching element of the U-phase of the inverter 11, 112 is the lower arm switching element, and 111D and 112D are reflux diodes connected in anti-parallel with the switching elements 111 and 112 respectively.

When acquiring a point at which the current reaches the vicinity of zero using a projected calculation, without detecting the current of the alternating current motor 21, as previously described, a projected current value calculated by calculation means is input into the comparator as the current information acquisition means, instead of a detected value from the current detector 209.

In FIG. 7, an emergency stop signal ES is a signal that is "0" when, for example, recognizing a case such as the direct current switch 42 of FIG. 14 being opened for some reason as an emergency time, and is "1" when the alternating current electric system is being driven normally.

While the emergency stop signal ES is "1", the upper and lower arm switching elements 111 and 112 of the U phase of the inverter 11 are turned on and off by control switching signals $S_1$ and $S_2$ respectively. Herein, when the emergency stop signal ES becomes "0", the control switching signals $S_1$ and $S_2$ are rendered inactive by actions of the AND gates 211 and 208. Because of this, the upper arm switching element 111 is turned off while the lower arm switching element 112 is turned on, at the same time as which the input of the comparator 210, which switches an output signal in accordance with the polarity of a current i, is activated. The comparator 210 outputs "0" when the current i is positive and "1" when the current i is negative, and the output is input into the zero latch circuit 207 via the OR gate 206.

The zero latch circuit 207 outputs "0" simultaneously with the input signal changing from "1" to "0", and holds that state from thereon. Consequently, "1" is input into the zero latch circuit 207 owing to the action of the OR gate 206 while the emergency stop signal ES is "1", after which, when the emergency stop signal ES becomes "0", "0" is input into the zero latch circuit 207 when the current i becomes positive.

The output signal of the zero latch circuit 207 forms an input signal of the AND gate 208, which generates a control signal of the lower arm switching element 112, wherein the switching element 112 is turned off by the input signal becoming "0".

The operations described above correspond to operations from the converter operation period a in, for example, FIG. 1, to turning off the lower arm switching element 112 in accordance with the polarity of the current i after entering the converter transition period b owing to the input of the emergency stop signal ES. When the switching element 112 indefinitely failing to reach an off-state due to some obstacle poses a safety problem, it is sufficient, when the emergency stop signal ES changes from "1" to "0", that the switching element 112 is compulsorily turned off after a predetermined time elapses. In the example of FIG. 7, the predetermined time can be adjusted by adjusting the time constants of the resistor 201 and capacitor 202, and an off-delay operation of the switching element 112 is possible via the waveform shaper circuit 203, which is connected to a connection point of the resistor 201 and capacitor 202, the AND gate 208, and the amplifier 212.

FIG. 7 is such that the required logic is mainly realized by an electronic circuit, but as is commonly known, there is a large degree of freedom in the configuration of an electronic circuit, and the electronic circuit shown in FIG. 7 is no more than the most basic example. Consequently, it is of course also possible to employ a circuit configuration other than that of FIG. 7, and it is also possible to realize one portion of the functions in FIG. 7 using software.

Next, a description will be given, based on FIG. 8 to FIG. 10, of an eleventh embodiment in which an alternating current electric system control method in accordance with the fifth embodiment is further characterized in that, when a restart of current flow is detected, or there is a state wherein current flow is possible again, after the current once becoming zero in an electric terminal for which both the upper and lower arm switching elements of the power converter are in an off-state in the converter transition period, electric terminals other than the relevant electric terminal are such that the lower arm switching element is put into an off-state and, when the current flowing is positive, the upper arm switching element is put into an on-state, and at the point at which the current flowing reaches the vicinity of zero, an operation putting the upper arm switching element into an off-state is carried out.

The configuration of FIG. 4 is such that, when the lower arm switching element of the first phase (herein called the A phase) of three phases is in an off-state in the converter transition period b, and when the remaining two phases (called the B phase and C phase) are in a short-circuited state, as described in claim 5, the following phenomenon may furthermore occur.

That is, when the potential of the A phase is lower than the potential of the short-circuited portions of the B phase and C phase, it may happen that the reflux diode connected in parallel with the lower arm switching element of the A phase becomes conductive, and current flows into the A phase again. This state is shown in FIG. 8, and in the example of FIG. 8, the current $i_v$ of the V phase remains negative and does not intersect with zero, because of which it is not possible to shift from the converter transition period b to the converter stop period c using the method of the fourth embodiment, and the converter transition period b is continued. The trigger for this phenomenon is that the current $i_w$ of the W phase (corresponding to what is called the A phase here), after once becoming zero, starts to flow again.

The heretofore described problem can be resolved using the following method. That is, as the reason for current flowing into the A phase again is the potential of the A phase becoming lower than the potential of the short-circuited portions of the B phase and C phase, as previously described, it is sufficient to create a state wherein, with the state of current flow in the B phase and C phase maintained, current is shut off by the potential of the A phase decreasing.

Figure 9:
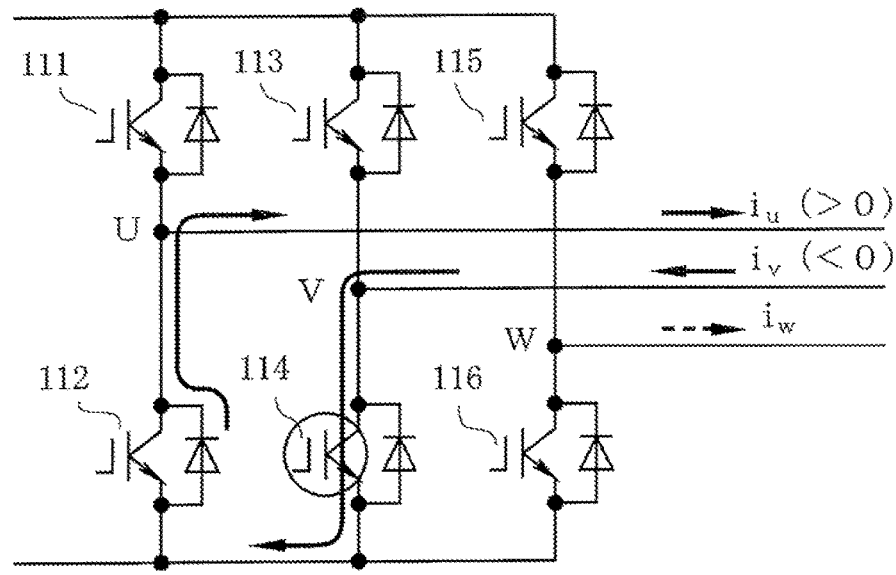
FIG. 9 is a configuration diagram of a main portion of an alternating current electric system for illustrating operations of an embodiment of the invention.
Figure 9:
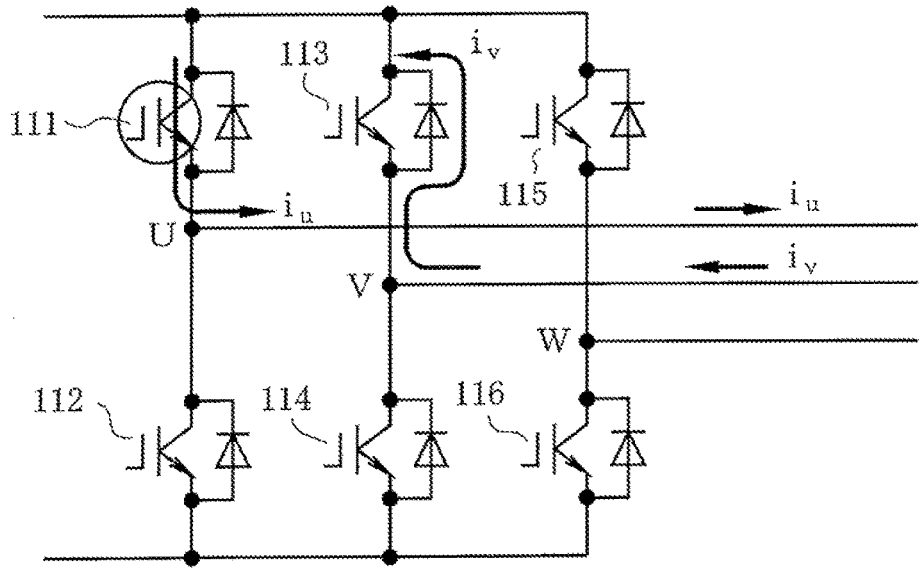

Specifically, when a restart of current flow is detected, or it is determined that there is a state wherein current flow is possible again, after the current of the A phase once becoming zero, it is sufficient that the state of each switching element is changed, as shown in FIG. 9. In FIG. 9, a switching element in an on-state is enclosed with a circle.

That is, the upper and lower arm switching elements of the inverter 11 are maintained in an off-state in the A phase (the W phase of FIG. 9), while in the B phase and C phase (the U phase and V phase respectively), firstly, the lower arm switching elements 112 and 114 are put into an off-state, and when the current is positive, the upper arm switching element 111 is put into an on-state. By this operation being carried out, current flows through the upper arm switching element 111 when the current is positive (in this example, the U phase current is positive), while current flows through a reflux diode connected in anti-parallel with the upper arm switching element 113 when the current is negative (in this example, the V phase current is negative).

That is, by the operation shown in FIG. 9 being carried out, the current short-circuit route is switched from the lower arm switching element group to the upper arm switching element group, with the state of current flow in the alternating current motor 21 maintained.

At this time, an upper arm reflux diode becomes a short-circuit route in the A phase (W phase), and the potential of the A phase is lower than the potential of the short-circuited portions of the B phase and C phase in this state, as previously described, because of which the upper arm reflux diode changes to a shut-off state, and current stops flowing.

By the heretofore described operation being carried out, the current flowing in the B phase and C phase presently reaches zero, and by the upper arm switching element previously put into an on-state being put into an off-state at this point, all the switching elements of the inverter 11 are in an off-state, and it is possible to shift to the converter stop period c with the current in a zero state.

Figure 10:
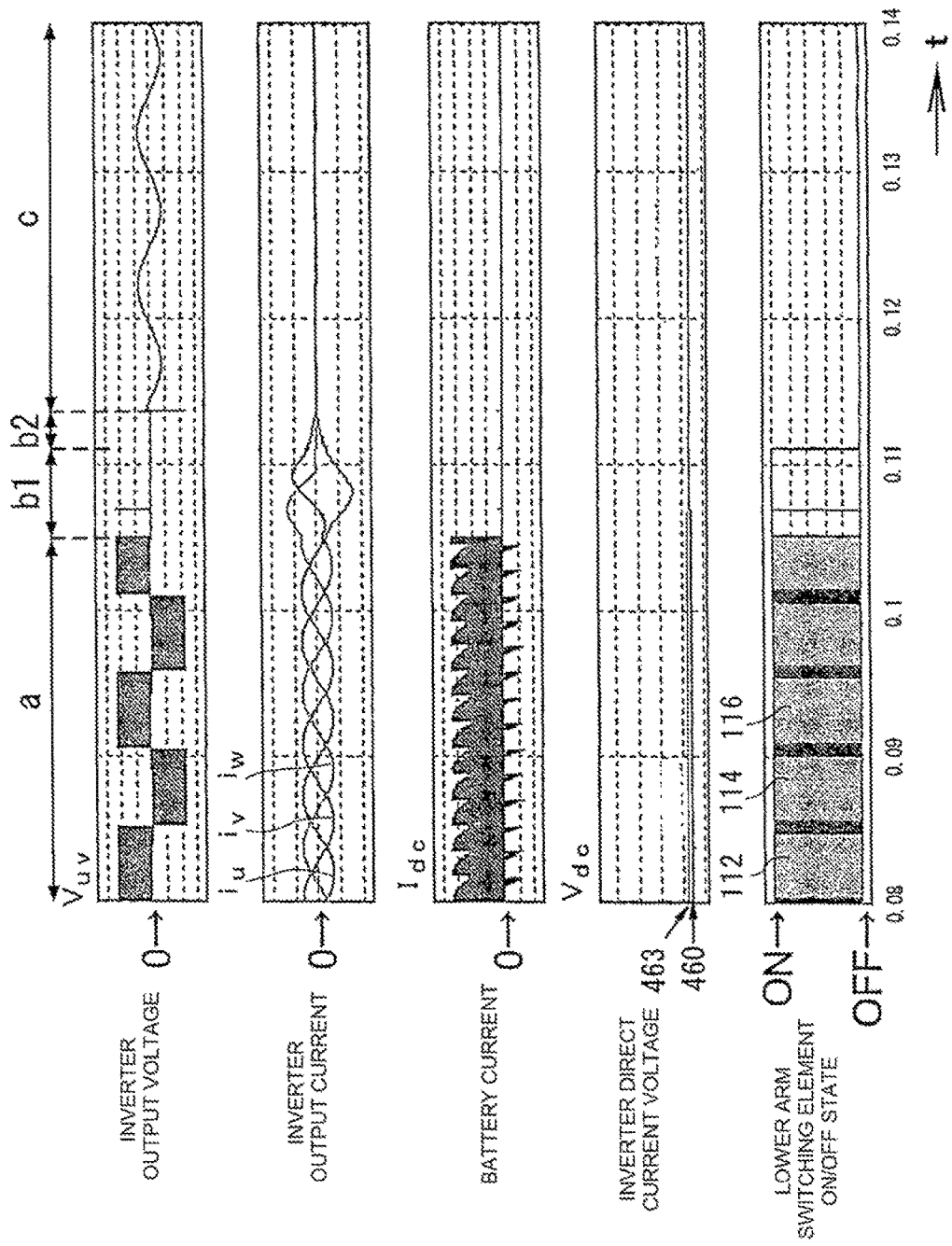
FIG. 10 is a waveform diagram showing operations of an embodiment of the invention.
Figure 11:
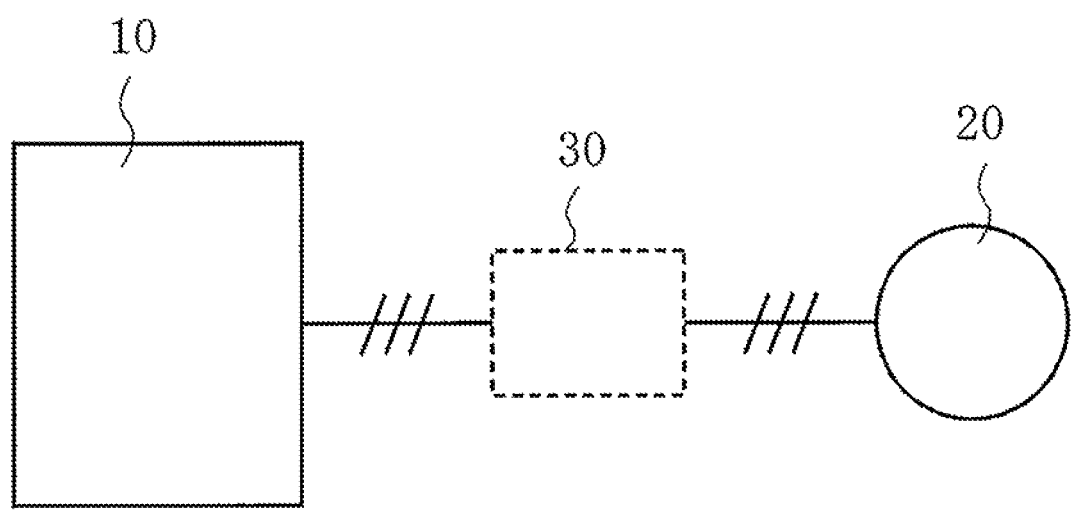
FIG. 11 is a conceptual diagram showing one example of an alternating current electric system.

Waveforms when the heretofore described series of operations is carried out are shown in FIG. 10.

Figure 8:
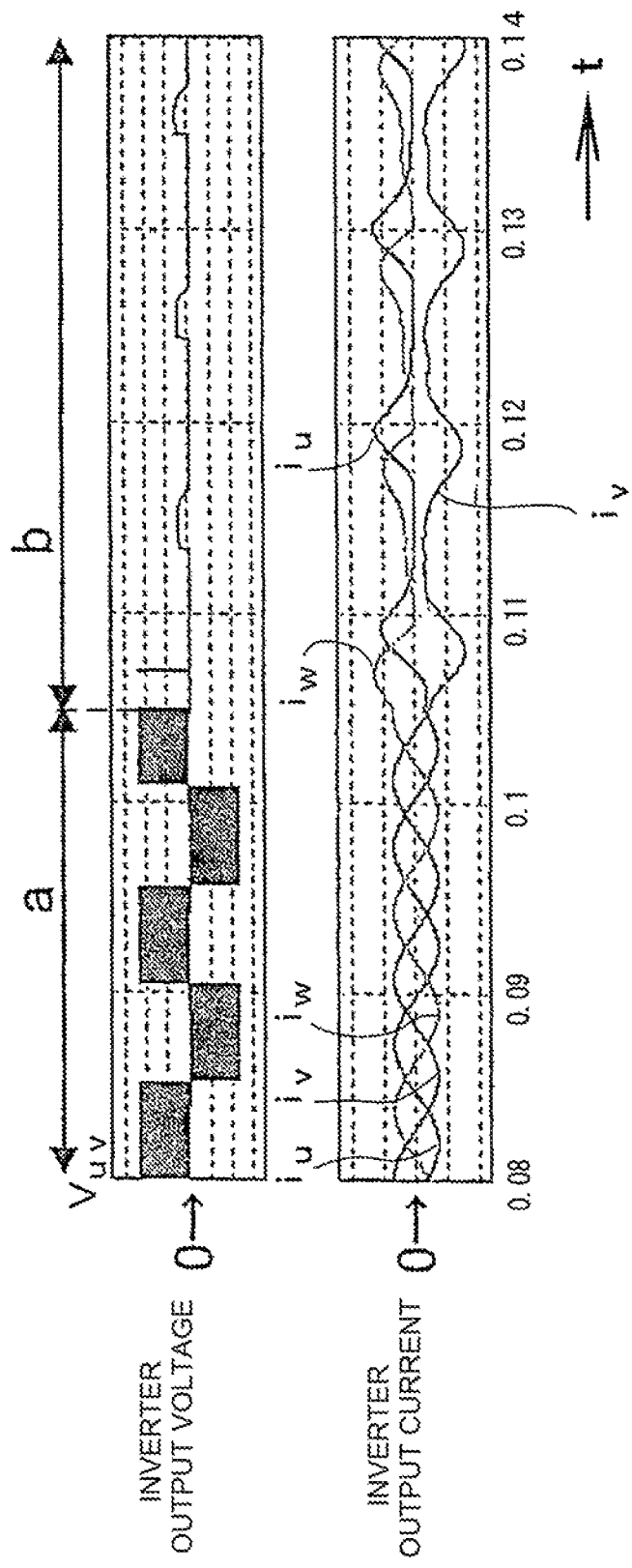
FIG. 8 is a waveform diagram showing a phenomenon when the invention according to an eleventh embodiment is not implemented.

After the current of the W phase shown in FIG. 8 becomes zero in a converter transition period b1, the current of the W phase is shut off by the upper arm reflux diode, while the state of flow in the U phase and V phase (B phase and C phase) is maintained, by the heretofore described switching operations of the upper and lower arm switching element groups being carried out in a period b2, in which the current starts to flow again.

Subsequently, the currents of the U phase and W phase also become zero, and the period b2 finishes, reaching the converter stop period c. The rise in the voltage of the direct current voltage unit at this time is extremely small, being 460V to 463V in the example, and it can be said that the rise in voltage is essentially eliminated.

In the above description, a description has been given of an operation switching the short-circuit path from the lower arm switching element group to the upper arm switching element group, but an operation switching from the upper arm switching element group to the lower arm switching element group can also be realized in exactly the same way, in accordance with a twelfth embodiment in which the fifth embodiment is characterized in that when a restart of current flow is detected, or there is a state wherein current flow is possible again, after the current once becoming zero in an electric terminal for which both the upper and lower arm switching elements of the power converter are in an off-state in the converter transition period, electric terminals other than the relevant electric terminal are such that the upper arm switching element is put into an off-state and, when the current flowing is negative, the lower arm switching element is put into an on-state, and at the point at which the current flowing reaches the vicinity of zero, an operation putting the lower arm switching element into an off-state is carried out.

Also, the control methods of the eleventh and twelfth embodiments can also be applied to an alternating current electric system having a direct current power supply such as the battery 41, as in the seventh embodiment.

INDUSTRIAL APPLICABILITY

The invention can be utilized in various kinds of alternating current electric system wherein power is exchanged between a power converter and an alternating current electric machine, typified by, for example, an electric vehicle or hybrid vehicle motor drive system wherein a vehicle driving alternating current motor is driven by an inverter.

REFERENCE SIGNS LIST

10: Power converter
11: Inverter
20: Alternating current electric machine
21: Alternating current motor
30: Reactance component
40: Power supply
50: Main capacitor
111 to 116: Semiconductor switching element
111D, 112D: Reflux diode
201: Resistor
202: Capacitor
203: Waveform shaper circuit
204: NOT gate
205, 206: OR gate
207: Zero latch circuit
208, 211: AND gate
209: Current detector
210: Comparator
212, 213: Amplifier

The invention claimed is:
1. An alternating current electric system, comprising:
an alternating current electric machine having a plurality of electric terminals;
a power converter that is connected to the electric terminals of the alternating current electric machine and that exchanges power with the alternating current electric machine, the power converter including semiconductor switching elements, such that each of the electric terminals is connected between an upper arm switching element and a lower arm switching element, the upper arm switching element and the lower arm switching element connected in series between direct current terminals of a direct current power source;

a control device that controls the switching elements of the power converter; and current information acquisition means for acquiring a point at which current flowing through each electric terminal of the alternating current electric machine is in the vicinity of zero, wherein the control device is configured to control an on-state of switching elements in the converter to short-circuit at least two of the plurality of electric terminals in the transition period to cause the current flowing through the electric terminals to reach the vicinity of zero and switching off the upper arm switching element and the lower arm switching element of a third electric terminal, and wherein the control device is configured to, after short-circuiting the at least two of the electric terminals and determining that current has restarted through the third electric terminal after the third electric terminal reaching a current of zero, perform sequentially, for each of the at least two electric terminals, an operation of opening the at least two electric terminals or putting the at least two electric terminals in a conductive state via rectifying elements in the power converter.

2. An alternating current electric system control method for an alternating current electric system having an alternating current electric machine, a power converter that is connected to a plurality of electric terminals of the alternating current electric machine and that exchanges power with the alternating current electric machine, and a control device that controls semiconductor switching elements that configure the power converter, each of the electric terminals being connected between an upper arm switching element and a lower arm switching element, the upper arm switching element and the lower arm switching element connected in series between direct current terminals of a direct current power source, said control method comprising:

determining a converter transition period for transitioning from a converter operation period in which power is exchanged between the power converter and alternating current electric machine to a converter stop period in which no exchange of power is carried out;

short-circuiting at least two of the plurality of electric terminals in the transition period by controlling switching elements in the power converter to cause the current flowing through the electric terminals to reach the vicinity of zero and switching off the upper arm switching element and the lower arm switching element of a third electric terminal; and after short-circuiting the at least two of the electric terminals and determining that current has restarted through the third electric terminal after the third electric terminal reaching a current of zero, performing sequentially, for each of the at least two electric terminals, an operation of opening the at least two electric terminals or putting the at least two electric terminals in a conductive state via rectifying elements in the power converter.

3. The alternating current electric system control method according to claim 2, wherein the power converter is a full-bridge type inverter, and wherein the operation short-circuiting the at least two electric terminals is carried out by causing current to flow back by switching semiconductor switching elements that make up the inverter and using reflux diodes connected in anti-parallel with the switching elements.

4. The alternating current electric system control method according to claim 3, wherein:

in the converter transition period, when the direction of the current flowing through each electric terminal is a forward direction from the power converter toward the alternating current electric machine, or when the size of the current flowing through each electric terminal is within a range from a predetermined negative value to zero, upper and lower arm semiconductor switching elements of the power converter connected to the relevant electric terminal are put into an off-state and the state maintained, when the size of the current flowing through each electric terminal is equal to or lower than the predetermined negative value, the upper arm switching element connected to the relevant electric terminal is put into an off-state and the lower arm switching element is put into an on-state, and the operation of opening the at least two electric terminals or putting the at least two electric terminals in a conductive state via rectifying elements in the power converter includes an operation of putting the lower arm switching element into an off-state at the point at which the current flowing through the respective terminal reaches the vicinity of zero.

5. The alternating current electric system control method according to claim 4, wherein the operation of each switching element is realized by projecting subsequent system behavior from the state of the system at the point at which the converter transition period starts.

6. The alternating current electric system control method according to claim 4, wherein the operation of opening the at least two electric terminals or putting the at least two electric terminals in a conductive state via rectifying elements in the power converter includes:

putting into an off-state the lower arm switching element and, when the current flowing is positive, putting the upper arm switching element into an on-state, and at the point at which the current flowing reaches the vicinity of zero, putting the upper arm switching element into an off-state.

7. The alternating current electric system control method according to claim 4, wherein the operation of opening the at least two electric terminals or putting the at least two electric terminals in a conductive state via rectifying elements in the power converter includes:

putting the upper arm switching element into an off-state and, when the current flowing is negative, putting the lower arm switching element into an on-state, and, after putting the lower arm switching element into the on-state, at the point at which the current flowing reaches the vicinity of zero, putting the lower arm switching element into an off-state.

8. The alternating current electric system control method according to claim 4, wherein:

the direct current power supply is connected via a direct current switch to a direct current voltage unit of the power converter, and in the converter transition period, the direct current switch is turned off while the at least two of the plurality of electric terminals are short-circuited by controlling the switching elements in the power converter to cause the current flowing through the electric terminals to reach the vicinity of zero.

9. The alternating current electric system control method according to claim 3, wherein:

in the converter transition period,
when the direction of the current flowing through each electric terminal is a forward direction from the power converter toward the alternating current electric machine, or when the size of the current flowing through each electric terminal is within a range from a predetermined negative value to zero, an upper arm semiconductor switching element of the power converter connected to the relevant electric terminal is put into an on-state and a lower arm semiconductor switching element put into an off-state,
when the size of the current flowing through each electric terminal is equal to or lower than a predetermined negative value, the upper and lower arm semiconductor switching elements of the power converter connected to the relevant electric terminal are put into an off-state and the state maintained, and
the operation of opening the at least two electric terminals or putting the at least two electric terminals in a conductive state via rectifying elements in the power converter includes an operation putting the upper arm switching element into an off-state at the point at which the current flowing through the respective electric terminal reaches the vicinity of zero.

10. The alternating current electric system control method according to claim 9, wherein the operation of each switching element is realized by projecting subsequent system behavior from the state of the system at the point at which the converter transition period starts.

11. The alternating current electric system control method according to claim 9, wherein:

the direct current power supply is connected via a direct current switch to a direct current voltage unit of the power converter, and in the converter transition period, the direct current switch is turned off while the at least two of the plurality of electric terminals are short-circuited by controlling the switching elements in the power converter to cause the current flowing through the electric terminals to reach the vicinity of zero.

12. The alternating current electric system control method according to claim 3, wherein:

the direct current power supply is connected via a direct current switch to a direct current voltage unit of the power converter,
and in the converter transition period, and
the direct current switch is turned off while the at least two of the plurality of electric terminals are short-circuited by controlling the switching elements in the power converter to cause the current flowing through the electric terminals to reach the vicinity of zero.

13. The alternating current electric system control method according to claim 2, wherein the alternating current electric machine is a permanent magnet synchronous machine.

14. The alternating current electric system control method according to claim 13, wherein the power converter is a full-bridge type inverter, and there exists a period in which the linear peak value of the induced electromotive force of the permanent magnet synchronous machine is higher than the voltage of the direct current voltage unit of the inverter.

15. The alternating current electric system control method according to claim 14, wherein the permanent magnet synchronous machine is configured so that an internal permanent magnet is not irreversibly demagnetized by current flowing due to short-circuiting of the electric terminals of the synchronous machine.

16. The alternating current electric system control method according to claim 13, wherein the permanent magnet synchronous machine is configured so that an internal permanent magnet is not irreversibly demagnetized by current flowing due to short-circuiting of the electric terminals of the synchronous machine.

* * * * *